United States Patent
Liang

(10) Patent No.: US 7,245,674 B2
(45) Date of Patent: Jul. 17, 2007

(54) METHOD AND SYSTEM FOR PROVIDING LOW POWER WLAN RECEIVER

(75) Inventor: Jie Liang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 700 days.

(21) Appl. No.: 10/724,376

(22) Filed: Nov. 28, 2003

(65) Prior Publication Data

US 2005/0117672 A1 Jun. 2, 2005

(51) Int. Cl.
*H03D 1/00* (2006.01)
*H04L 27/06* (2006.01)

(52) U.S. Cl. ............... 375/340; 375/338; 375/346; 455/67.11; 455/67.13

(58) Field of Classification Search ............. 375/338, 375/340, 149, 260, 316, 346; 370/252, 338, 370/230; 455/343.4, 234, 65, 557, 333, 67.11, 455/343
See application file for complete search history.

(56) References Cited

U.S. PATENT DOCUMENTS

| | | | |
|---|---|---|---|
| 6,847,678 B2 * | 1/2005 | Berezdivin et al. | ......... 375/146 |
| 6,922,549 B2 * | 7/2005 | Lyons et al. | .............. 455/67.13 |
| 7,120,427 B1 * | 10/2006 | Adams et al. | .............. 455/418 |
| 7,139,536 B2 * | 11/2006 | Chiu | ........................ 455/115.1 |
| 7,151,759 B1 * | 12/2006 | Ryan et al. | .................. 370/332 |
| 2002/0126768 A1 * | 9/2002 | Isaksson et al. | ............ 375/298 |
| 2004/0022225 A1 | 2/2004 | Liang et al. | |
| 2004/0072588 A1 * | 4/2004 | Beach et al. | .............. 455/550.1 |
| 2004/0202133 A1 * | 10/2004 | Filipovic | ..................... 370/332 |
| 2005/0026565 A1 * | 2/2005 | Goldstein et al. | ........ 455/67.11 |
| 2005/0095987 A1 * | 5/2005 | Lyons et al. | .............. 455/67.13 |
| 2005/0128987 A1 | 6/2005 | Liang | |
| 2005/0208897 A1 * | 9/2005 | Lyons et al. | .............. 455/67.11 |
| 2006/0193277 A1 * | 8/2006 | Keaney et al. | .............. 370/310 |
| 2006/0194614 A1 * | 8/2006 | Weste et al. | ................. 455/557 |

OTHER PUBLICATIONS

Jin-Jun Xiao; Shuguang Cui; Zhi-Quan Luo; Goldsmith, A.J.; "Joint estimation in sensor networks under energy constraints", IEEE, Communications Society Conference on Communications and Networks Oct. 4-7, 2004 pp. 264-271.*

Che-Shen Yeh and Yinyi Lin, "Channel Estimation using Pilot Tones in OFDM Systems", IEEE, Transactions on Broadcasting, vol. 45, No. 4, Dec. 1999, pp. 100-409.*

* cited by examiner

*Primary Examiner*—Mohammed Ghayour
*Assistant Examiner*—Qutub Ghulamali
(74) *Attorney, Agent, or Firm*—Steven A. Shaw; W. James Brady; Frederick J. Telecky, Jr.

(57) ABSTRACT

A method and system for conserving power in a WLAN receiver is provided by a channel estimator for detecting transmitted errors in a transmitted packet and providing equalization for the detected channel errors; a separate pilot processor for detecting off set errors from the channel estimation and providing off set correction to said equalization for the whole data portion of the packet after the preamble and a control response to the start of each packet for enabling said channel estimator during the preamble and thereafter disabling said channel estimator for the remainder of the packet and storing the estimated value.

12 Claims, 2 Drawing Sheets

METHOD AND SYSTEM FOR PROVIDING LOW POWER WLAN RECEIVER

CROSS-REFERENCE TO RELATED APPLICATIONS

This invention is related to co-pending application of Jie Liang filed on the same date herewith entitled "Receiver directed power management for WLAN receiver." This application is incorporated herein by reference.

FIELD OF INVENTION

This invention relates to communication systems and in particular to Wireless Local Area Network (WLAN) transceiver system and more particularly to reducing the power usage in WLAN receivers for channel estimation and pilot processing.

BACKGROUND OF INVENTION

Wireless Local Area Networks (WLANs) are becoming very popular today whereby the transceiver may be small and the user no longer needs to be tied to an Ethernet cable. It is also desirable that the communications device such as a wireless transceiver be a mobile battery powered device. The transceiver may be in the form of a lap top computer or a cell phone.

Because the transceiver is often used without connection to a power source through a power cord, the transceiver is therefore subject to battery drain that limits its use away from a power source. Extending the time period between battery charges is of key importance to continued communications. Various subsystems of a battery powered device may place heavier demands upon battery resources than others. When the battery powered device employs a wireless transceiver to transmit and receive data, the transceiver typically consumes significant quantities of battery power which impacts battery life.

In order to increase the overall battery life of such transceivers, power management schemes have been utilized where the communications device enters a sleep mode where only the basic device functions such as system clock, timers, interrupts, etc. are operational. In this mode the device can neither transmit nor receive information and therefore can not perform any communication activities.

It is desirable to provide a power management system that does not impair the communications capability. Power consumption has become a major performance factor for the WLAN chipset. An important task of the IEEE 802.11a/g standard is the power consumption.

SUMMARY OF INVENTION

In accordance with one embodiment of the present invention a method of conserving power in a WLAN receiver includes the operating channel estimation processing for only the preamble portion of each packet and thereafter using the channel estimated value determined during for the duration of the packet.

In accordance with an embodiment of the present invention the method of conserving power includes the steps of enabling a channel estimator only during the preamble of each packet and running pilot processing after the preamble.

In accordance with an embodiment of the present invention a system for conserving power in a WLAN receiver includes a channel estimator for detecting transmitted errors in a transmitted packet and providing equalization for the detected channel errors; a separate pilot processor for detecting off set errors from the channel estimation and providing off set correction to the equalization for the whole data portion of the packet after the preamble and a control response to the start of each packet for enabling the channel estimator during the preamble and thereafter disabling said channel estimator for the remainder of the packet and storing the estimated value.

DESCRIPTION OF PREFERRED EMBODIMENTS

Figure 1:
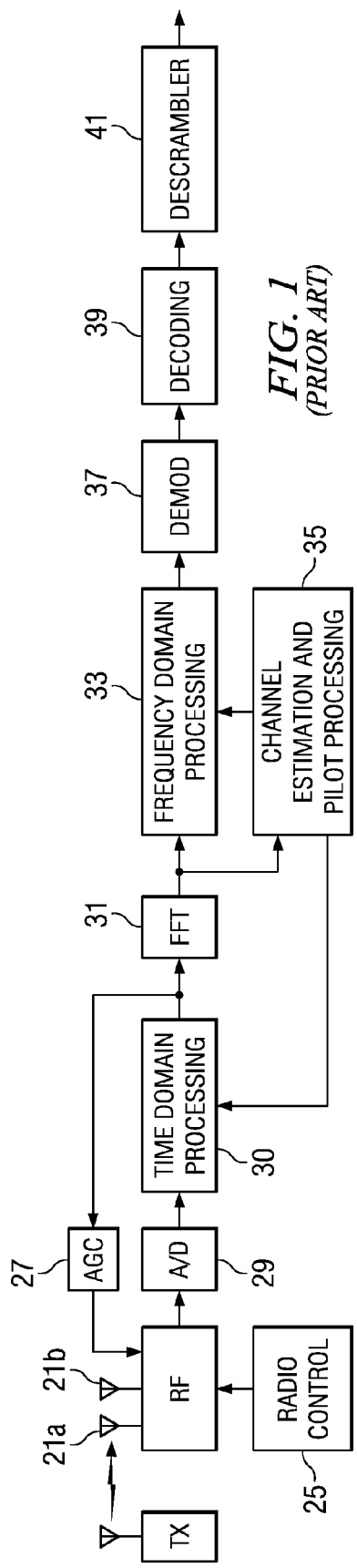
FIG. 1 illustrates a typical WLAN system.

As illustrated in FIG. 1 a typical WLAN network includes a transmitter TX transmitting signals over a wireless channel to a receiver RX. The transmitter TX sends the information in bursts or packets. A typical receiver Rx receives RF signal through a diversity antenna system 21 and processes the RF signal through an RE stage 23 including radio control setting 25, automatic gain control (AGC) 27 and signal diversity selection takes place. The gain control and diversity control are made at the beginning. The receiver usually has two antennas, 21a and 21b, and the one with the strongest signal or signal to noise ratio is selected.

The output from the RF stage is down converted using a free running local oscillator. The receiver local oscillator is free running and therefore there is usually an offset frequency from that of the transmitter local oscillator. Here is where a timing estimation and correction is done. The output from the down converter is sampled and converted to digital at an analog to digital convertor (A/D) 29 passes to a Fast Fourier Transform module (FFT) 31 through time domain processing 30. The output from the FFT 31 is applied to the frequency domain processing 33. The output from the FFT is processed for channel compensation due to wireless channel fading, timing errors and frequency offset. The output samples from the FFT 31 are applied to a single clock enabled module 35 enabled for channel estimation and pilot processing. The output from the channel estimation and pilot processing module 35 is applied to time domain processing 30 and frequency domain processing 33. The output from the frequency domain processing 33 is demodulated through demodulation stage 37 and then is decoded at decoder 39, descrambled at descrambler 41 and applied to the MAC interface to the user.

Figure 2:
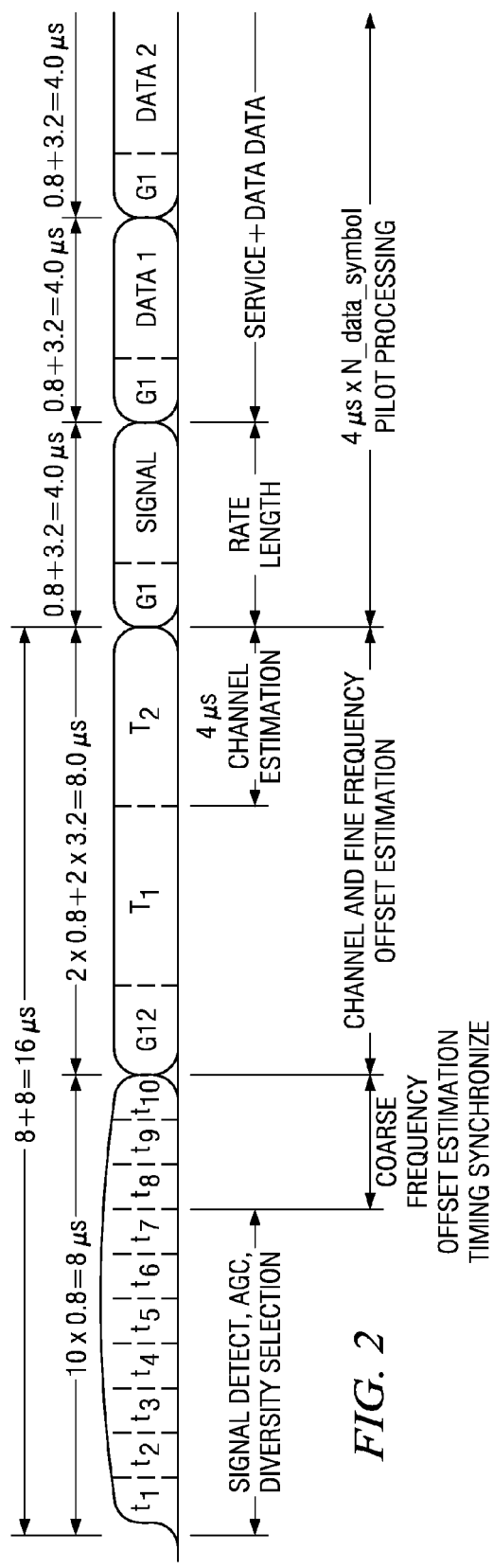
FIG. 2 illustrates OFDM processing duty cycle.

Each packet starts with a 16 microsecond long preamble followed with data symbols such as symbols 1, 2, 3 etc. FIG. 2 illustrates the Orthogonal Frequency Division Multiplexing (OFDM) processing duty cycle. The first eight microseconds (t1-t8) includes the identifier at times t1-t10 during which signal detection, radio control setting, automatic gain control (AGC) and signal diversity selection takes place. During times t8 through t10 coarse frequency estimations are done for timing synchronization. The boundary of the packet is selected. There is a circuit that does a correlation to determine the type of packet as compared to other signals. It determines that it is the start of a standard 802.11 type packet as compared to other signals. At times T1 and T2 channel and fine frequency offset estimation is done. There is a short sequence processing to determine the coarse and fine frequency offset.

The channel estimation is done on the long sequence portion of the preamble (8 microseconds). The data symbols follow the preamble. The channel is subject to distortions such as from multi-path echo signals. The preamble contains data signals for channel estimation that are sent over the channel to the receiver RX. These data signals are known at the receiver RX. The receiver RX compares the pattern of the received data signals from the channel to the known data signals and determines an estimate of the channel distortions (Hg). The receiver then has an equalizer at the receiver front end that applies an inverted value of the detected channel distortion (1/Hg) to substantially equalize or remove the distortions based on the channel estimate.

Also, because the channel may change during the packet a second type of equalization is used is that of pilot processing where in the data symbols to follow the preamble pilot tones are inserted in each symbol for comparing to known tones to measure the error. The system then tracks the channel changes by tracking this pilot to get an offset estimation.

By analyzing the MIPS (Million Instruction Per Second (MIPS) requirement of the channel estimation and pilot processing algorithms it has been determined that the typical channel estimation algorithm costs more MIPS than pilot tracking. It has been determined that a significant portion of ODFM baseband power is in channel estimation and pilot processing in the single module.

One implementation of the channel estimation and pilot tracking module is made of a bank of 13 complex Multiply Accumulate (MAC) units. The majority of the combined channel estimation and pilot processing module power is consumed by these MAC units. Both channel estimation (during long sequence processing—8 microseconds) and pilot processing during data symbols share the same module.

The algorithm for channel estimation is y=Ax, where A is a 52×52 complex matrix, LS (Long Sequence) inverse matrix for a given channel rank x is 52×1 complex vector, raw channel gain y is the smooth channel gain for each tone.

The MIPS estimation where a matrix/vector multiplication is involved:

52×52 complex matrices, 52×1 vector

The computation needs to be completed in about 4 microsecond

The total MIP is 2.5 GOPs (assume 4 real MAC=1 complex MAC).

The MIPS requirement for pilot processing according to the algorithm is:

Step 1: Linear regression on each of 4 pilots (phase unwrap)

Step 2: Weighted LS solution for intercept at current symbol (4×2 matrix)

Step 3: Linear regression on the phase offset (intercept) across symbols

Step 4: Calculate Correction factor for each tone (48 tones)

The MIPS estimation:

Linear Regression: new results can be obtained based on running sum (only add new updates)

$Y = b \cdot x + a$, then $$b = \frac{\frac{1}{n}\left(\sum_{i=1}^{N} x_i \cdot y_i\right) - \overline{x} \cdot \overline{y}}{\frac{1}{n}\sum_{i=1}^{N} x_i^2 - \overline{x}^2}, \quad a = \overline{y} - b \cdot \overline{x}$$

MIPS estimation:
   Weighted LS solution:

$y = (z^t W z)^{-1} z^t W x$, where $W \in R4 \times 4$, $z \in R4 \times 2$, $x \in R4 \times 1$, $y \in R2 \times 1$ Total of 5 linear regression (8 MAC/LR), and 1 LS matrix inversion (56 MAC), plus compensation factors (48 MAC)

Total MIPS is 36 MIPS.

The duty cycle of the two processing tasks are very different. The channel estimation needs to be done only once for every packet and the value can be stored in a register and used for the duration of the packet. The pilot processing is active throughout the whole time following the preamble portion. In accordance with the present invention a lot of power saving is achieved if a simpler module can be used exclusively for pilot processing after the preamble and the channel estimator operated only during the preamble of each packet. This control is provided by a state machine identifying when the preamble is finished.

Figure 3:
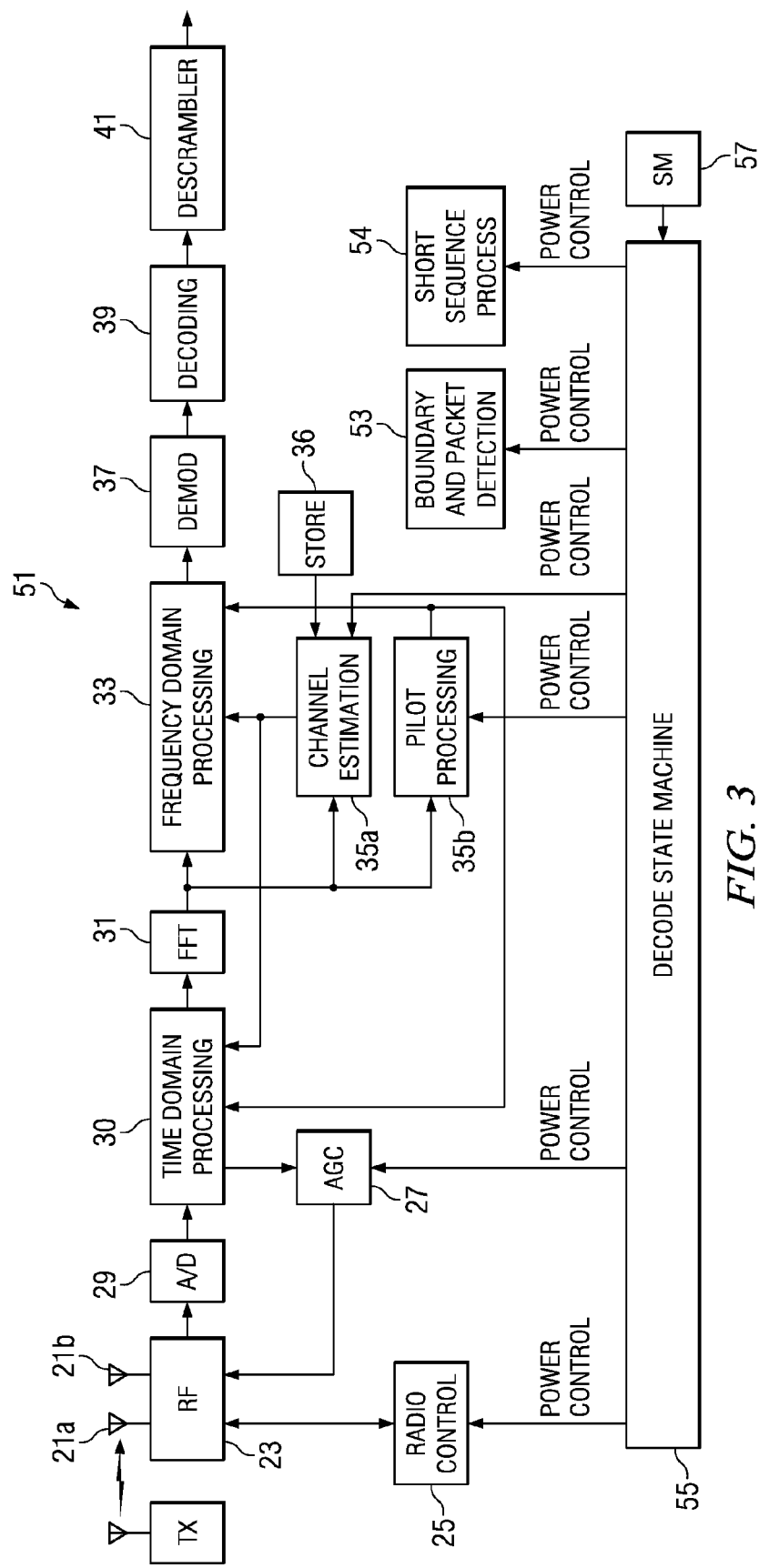
FIG. 3 illustrates a WLAN receiver according to one embodiment of the present invention.

In accordance with the present invention as illustrated in FIG. 3 there is provided the receiver 51 with a separate channel estimator 35a and separate pilot processing 35b and a control logic decode state machine 55 that is response to a new packet to turn on the channel estimator 35a for channel estimation time period only in the preamble and the channel estimation channel estimation module value is stored in a register and used until the start of a new packet with a preamble. FIG. 3 uses the same callouts for the same elements in FIG. 1. The elements in FIG. 3 that are now controlled are modified to be controllable. The channel estimator 35a receives the data signal sent over the channel and compares this with the known data signals stored in the receiver and determines the channel distortion. The inverse of this channel distortion is then calculated and stored at the output register 36 of the channel estimator 35a to be used to equalize the received signal from the channel. The pilot processing 35b is used throughout the whole data portion after the preamble until the presence of a new packet. The pilot signals are at a set of four frequency bands in the received data signals.

The block diagram of FIG. 3 illustrates that out of the FFT there are two modules 35a and 35b with one for channel estimation only and one for pilot processing only where a power control signal from the decode state machine 55 enables the channel estimate operation only during the preamble of a new packet and the equalization values is stored in the channel estimate register and used through out the packet. The power control signal from the decode state machine 55 enables the pilot processing during the whole data portion of the packet. The pilot processing 35b operates during the whole data period following the preamble and provides new error signal values and correcting values every data symbol. This correcting value from the pilot processing is algebraically summed with that from the channel estimate register. The decode state machine 55 is controlled by the status of the receiver state machine 57. The output from channel estimation and pilot processing is provided to the time domain processing 30 and the frequency domain processing 33 to provide the equalization.

The pilot processing takes about 1.4% of MIPS compared with channel estimation. A dedicated pilot processing module may use a subset of the MAC units used for channel estimation. One prior art process uses 56 milliwatts. The new process uses only 6 milliwatts with no degradation of performance. The savings is 50 milliwatts.

Although the invention has been described with reference to specific embodiments, the description is intended to be illustrative of the invention and is not intended to be limiting. Various modifications and applications may occur to those skilled in the art without departing from the true spirit and scope of the invention as defined in the appended claims.

The invention claimed is:

1. A method of conserving power in a WLAN receiver having a module for channel estimation only and a module for pilot processing only of a plurality of packets, said method comprising:
   enabling said channel estimation module only during a preamble of each packet;
   providing a plurality of channel estimator values;
   storing said plurality of channel estimator values; and
   enabling pilot processing module for the duration of the packet after the preamble of each packet using said plurality of stored channel estimator values.

2. A method of claim 1:
   wherein enabling pilot processing for the duration of the packet after the preamble of each packet comprising:
   providing a plurality of channel estimation pilot processing values; and
   providing off set error values from the plurality of channel estimation pilot processing values.

3. The method of claim 2 including the step of summing said stored channel estimator values for the duration of the packet with said off set error values determined by the pilot processing.

4. A system for conserving power in a WLAN receiver comprising:
   an equalizer;
   a dedicated channel estimator enabled only during the preamble of each packet for detecting transmitted errors in a transmitted packet and providing equalization to said equalizer for the detected transmitted channel errors;
   means response to the start of each packet for enabling said channel estimator during the preamble and thereafter disabling said channel estimator for the remainder of the packet; and
   a store for storing the channel estimated values for the duration of the packet.

5. The system of claim 4 further comprising a separate pilot processor for detecting off set errors from the channel estimation and providing off set correction to said equalizer for the duration of the packet after the preamble.

6. The system of claim 5 wherein said stored channel estimator values for the duration of the packet is summed with said off set errors values determined by the pilot processing.

7. The system of claim 6 wherein said equalizer includes a frequency domain equalizer.

8. The system of claim 6 wherein said equalizer includes a time domain equalizer.

9. The system of claim 6 wherein said equalizer is a frequency domain equalizer and a time domain equalizer.

10. The system of claim 5 wherein said equalizer is a frequency domain equalizer and a time domain equalizer.

11. The system of claim 5 wherein said means for enabling and disabling said channel estimator and enabling said separate pilot processing equalizer for the whole data portion of the packet after the preamble includes a means for decoding the status of the receiver state machine.

12. The system of claim 4 wherein said means for enabling and disabling said channel estimator includes a means for decoding the status of the receiver state machine.

* * * * *